United States Patent [19]

Bobo

[11] 4,062,515
[45] Dec. 13, 1977

[54] COMPACT GATE VALVE
[75] Inventor: Gerald E. Bobo, Knoxville, Tenn.
[73] Assignee: The United States of America as represented by the United States Energy Research and Development Administration, Washington, D.C.
[21] Appl. No.: 686,446
[22] Filed: May 13, 1976
[51] Int. Cl.² ............................................... F16K 3/10
[52] U.S. Cl. ..................................... 251/167; 251/58; 251/175; 251/187; 251/335 B
[58] Field of Search ................ 251/58, 167, 169, 175, 251/187, 195–202, 335 B

[56] References Cited
U.S. PATENT DOCUMENTS

| 2,467,945 | 4/1949 | Pottmeyer | 251/58 X |
| 3,136,330 | 6/1964 | Dowling | 251/196 X |

FOREIGN PATENT DOCUMENTS

| 1,937,366 | 7/1969 | Germany | 251/167 |
| 402,914 | 9/1924 | Germany | 251/199 |
| 476,756 | 5/1929 | Germany | 251/196 |

Primary Examiner—Robert G. Nilson
Attorney, Agent, or Firm—Dean E. Carlson; Stephen D. Hamel; Fred O. Lewis

[57] ABSTRACT

This invention relates to a double-disc gate valve which is compact, comparatively simple to construct, and capable of maintaining high closing pressures on the valve discs with low frictional forces. The valve casing includes axially aligned ports. Mounted in the casing is a sealed chamber which is pivotable transversely of the axis of the ports. The chamber contains the levers for moving the valve discs axially, and an actuator for the levers. When an external drive means pivots the chamber to a position where the discs are between the ports and axially aligned therewith, the actuator for the levers is energized to move the discs into sealing engagement with the ports.

10 Claims, 2 Drawing Figures

COMPACT GATE VALVE

BACKGROUND OF THE INVENTION

This invention was made in the course of, or under, a contract with the United States Energy Research & Development Administration.

This invention relates generally to gate valves and more particularly to gate valves for use with corrosive and/or toxic gases. Such valves commonly include a valve disc assembly which is lowered vertically to bring the valve discs into register with the valve ports and then moved horizontally to close the ports. Two such valves designed for controlling the flow of gaseous uranium hexafluoride ($UF_6$) are described in the following: U.S. Pat. No. 2,520,364 to Hobbs, and U.S. Pat. No. 3,815,868 to Bobo et al.

Gate valves of the above-mentioned type are subject to several shortcomings. For instance, they are comparatively large, complex, and expensive. Moreover, the main mechanism of such valves is in direct contact with the corrosive and chemically reactive process gas. This means that lubrication of the mechanism is not practical and high friction forces are present. Furthermore, such valves are poorly suited for use as throttling valves. In addition, because these valves are screw-driven, they are inherently very slow to operate.

SUMMARY OF THE INVENTION

Accordingly, it is an object of this invention to provide a comparatively simple and small gate valve which is fast-acting but requires only relatively low actuating forces.

It is another object to provide a gate valve having some components which are exposed to the process environment but which operate without sliding metal-to-metal contact.

It is another object to provide a gate valve which is comparatively well adapted for use as a throttling valve.

The invention can be summarized as follows:

A gate valve comprising: A casing enclosing annular seating surfaces defining first and second ports having a common axis; a gate assembly pivotally mounted in said casing for movement in a plane transverse of said axis, said assembly including:
  a. a pair of valve discs having frontal sealing surfaces for respectively engaging said seating surfaces to close said ports;
  b. levers respectively connected to said discs;
  c. means for operating said levers to move said discs along said axis to open and close said ports; and
  d. a housing isolating said levers and said means from said casing, said housing including flexible sealing means respectively connected to said discs for accommodating movement of said discs along said axis.

DESCRIPTION OF THE PREFERRED EMBODIMENT

Figure 1:
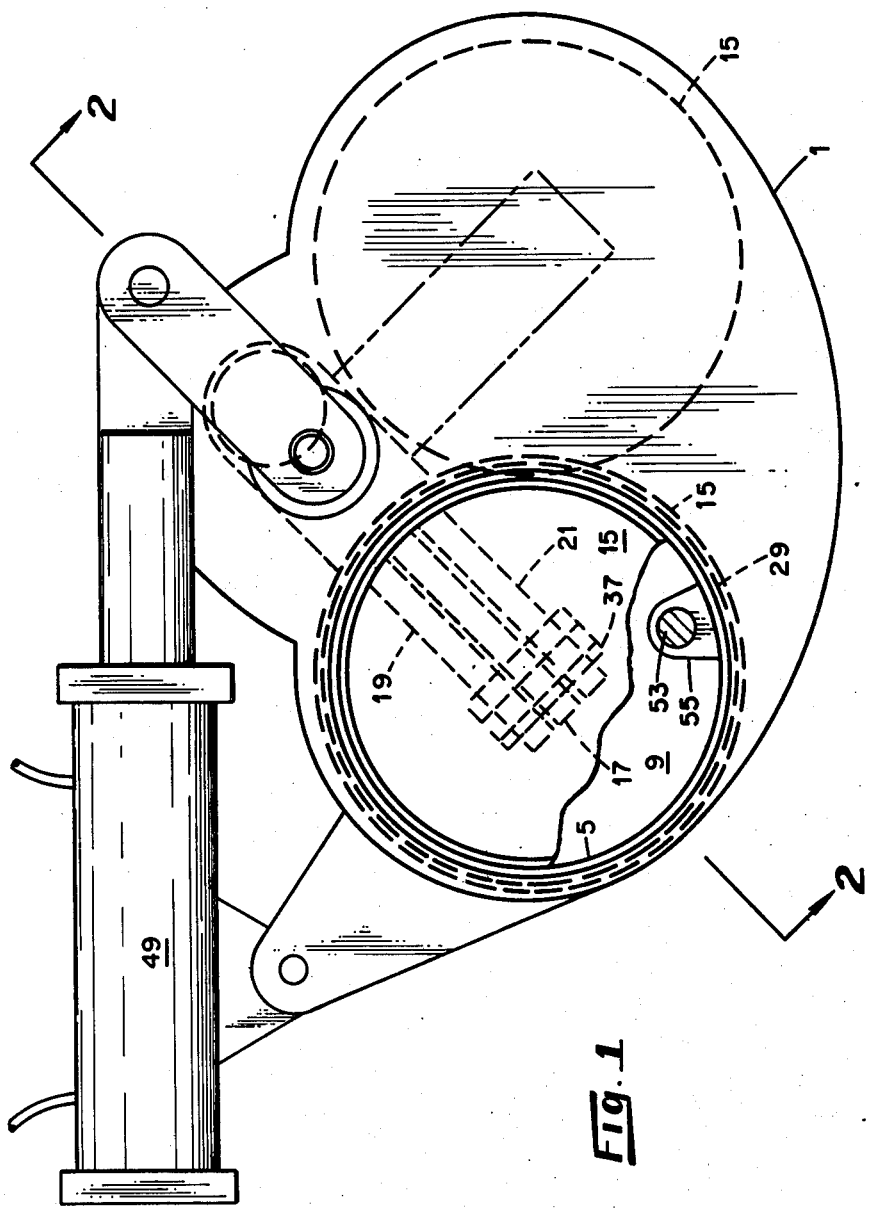
FIG. 1 is a side view of a gate valve designed in accordance with this invention.

The invention will be illustrated herein chiefly in terms of a double-disc gate valve designed for use in gaseous $UF_6$ at an elevated temperature. The valve may be composed throughout of conventional components.

Referring to the figures, the new gate valve includes a casing 1. The casing enclosed opposed annular seating surfaces 3 and 5 which have a common axis A and which defines valve ports 7 and 9. Mounted in the casing is a gate assembly which includes a pair of spaced, back-to-back valve discs 13 and 15; three generally L-shaped lever-arms 17, 19 and 21; means 23 for effecting movement of said discs along said axis by means of the levers; and a housing 25 isolating the levers and the actuating means 23 from the casing. The housing includes two bellows members 39 and 41.

The valve discs 13 and 15 carry frontal sealing rings 27 and 29 for respectively engaging the seats 3 and 5 to close the valve ports. As shown, the shorter legs of the levers 19 and 21 are pivotally connected to spaced lugs 31 on the back of the disc 15, their longer legs being similarly connected to spaced extensions 32 and 34 of the frame of the actuator means 23. The actuator 23 may comprise a double-acting pneumatic or hydraulic cylinder having a piston-driven stem 33. As shown (FIG. 1) the lever 17 is connected between arms 19 and 21, with its shorter leg pivotally connected to a lug 30 on the back of disc 13 and its longer leg similarly connected to the stem 33. The three levers are connected by a pin 37, about which they can pivot, or rock.

Figure 2:
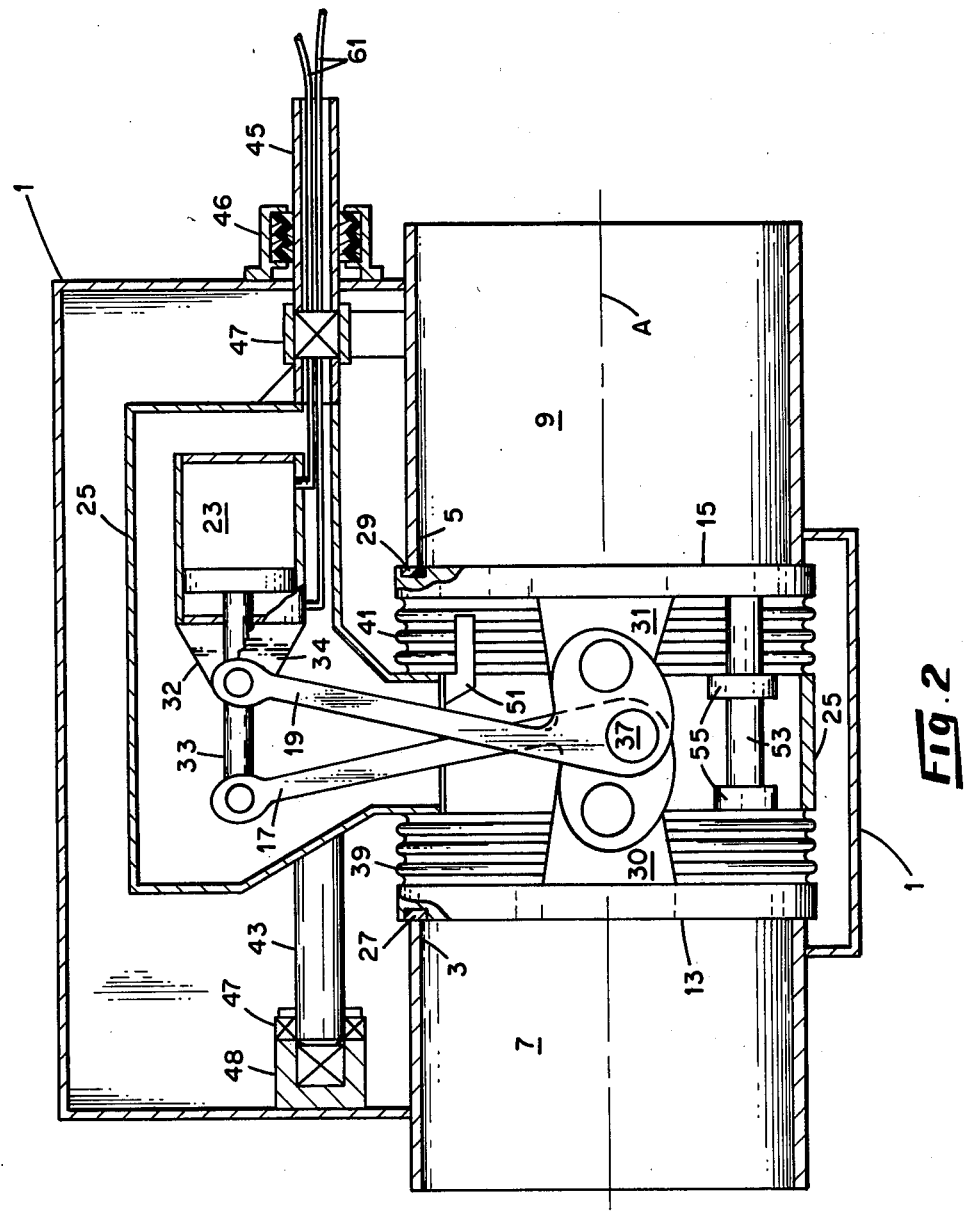
FIG. 2 is a longitudinal sectional view of the same, taken along line 2—2.

As shown, the bellows portions 39 and 41 of the housing 25 are respectively connected to the backs of the valve discs to seal the interior of the housing from the casing 1 and to permit movement of the discs along axis A. Rearward travel of the discs is limited by stops 51 mounted to the housing. A typical stop is shown in FIG. 2. Means are provided for preventing lateral shifting of the discs during their movement along axis A. A typical arrangement for preventing such shifting of disc 15 is illustrated in FIG. 2, which shows a pin 53 which is affixed to the rear of the disc and is slidably engaged by guide brackets 55 mounted to the housing 25. Preferably, each disc is provided with a plurality of such arrangements.

Referring to FIG. 2, the gate assembly is supported near its upper end by rotatable, axially aligned shafts 43 and 45, each of which has an end affixed to the housing 25 and each of which is supported by bearings 47 carried by the casing. A thrust bearing 48 also is provided as shown. The shaft 45 which is hollow, extends through the casing and a conventional shaft seal 46. As shown in FIG. 1, the external end of shaft 45 is connected to any suitable operator 49 (FIG. 1) for imparting arcuate movement to the shaft to pivot the gate assembly transversely of the axis A. More specifically, the means 49 pivots the gate assembly between a position where the discs 13 and 15 are respectively aligned with the seats 3 and 5 and a postion where the discs are remote from the seats. The latter position is indicated by dashed lines in FIG. 1.

As indicated in FIG. 2, shaft 45 is formed with an axial bore for the passage of fluid-containing lines 61 which extend from the actuator 23 to any suitable external operator therefor (not shown).

With the valve in the full-open position (gate assembly pivoted to the position shown in dashed lines in FIG. 1), process gas flow through the ports is unrestricted. The interior of the casing is exposed to the corrosive process gas, but the seal 46 prevents outleakage of the gas from the casing, whereas the housing 25 (including the bellows 39 and 41) isolates the interior of the gate assembly from the gas. Closing of the valve is effected by actuating the operator 49 to pivot the gate assembly to the position where the sealing rings 27 and 29 are in register with the seats 3 and 5. The actuator 23 then is energized to move the upper end of the lever 17 away from levers 19 and 21, thus pivoting the three levers about pin 37 and moving the valve discs outward to close the valve. The acutator remains energized to maintain a selected pressure on the discs when closed. Opening of the valve is effected by reversing the actuator 23 to retract the discs along axis A, and then energizing the operator 49 to pivot the gate assembly to the remote position. It will be apparent that, if desired, the valve can be employed to throttle the flow by pivoting the gate assembly to intermediate positions where it partially overlaps the valve ports.

Where the process gas is $UF_6$, the valve components that will be in contact with the gas are made of materials compatible with the same. For example, the discs, casing, housing, and shafts may be formed of nickel-plated steel, the seats and bellows, of phosphor bronze; the sealing rings, of Teflon; the shaft bearing surfaces, of Teflon; and the shaft packing, of Teflon.

This invention provides important advantages over conventional gate valves. For example, sliding between the sealing rings and seats is essentially eliminated. All of the sliding bearing surfaces, except the Teflon shaft bearing, are isolated from the process gas. The stem seal 46 sees only rotary motion. The rockerarm arrangement is comparatively small and is not complex, yet it provides a very high leverage factor. Thus, comparatively low actuating forces are required to develop high seating forces--e.g., seating forces of 600 pounds per inch of seat circumference. The valve design ensures comparatively low differential gas loads on the discs, since the interior of the valve assembly is always vented to atmospheric pressure through the hollow shaft 45. In previous gate valves the zone between the discs can at times be at a pressure level higher than atmospheric. This means that under certain operating conditions a higher differential pressure can exist across a valve disc than would otherwise be present.

It will be apparent to those versed in the art that various modifications can be made to the invention as illustrated without departing from the scope of the appended claims. One of the outer levers 19 and 21 may be omitted, although preferably two such levers are employed to avoid applying undesirable torsion and bending forces to the actuator 23 and its stem 33. It will be apparent that the stem 33 may be operated by any suitable means, such as electrically driven gears, although a pneumatic operator is preferred for high temperature environments. If desired, the shaft seal 46 may be mounted to the inside wall of the casing.

What is claimed is:
1. A gate valve comprising:
    a casing enclosing annular seating surfaces defining first and second ports having a common axis;
    a gate assembly mounted in said casing for arcuate movement toward and away from said common axis and including:
        a. a pair of valve discs having frontal sealing surfaces for respectively engaging said seating surfaces to close said ports;
        b. levers respectively connected to said discs;
        c. means for operating said levers to move said discs along said axis to open and close said ports; and
        d. a housing isolating said levers and said means from said casing, said housing including flexible sealing means respectively connected to said discs for accommodating movement of said discs along said axis.
2. The valve of claim 1 wherein said levers are generally L-shaped arms which are pivotally connected to one another intermediate of their ends.
3. The valve of claim 2 wherein the shorter legs of said levers are respectively connected to the backs of said valve discs.
4. The valve of claim 1 wherein said flexible sealing means are bellows.
5. The valve of claim 1 wherein said housing is provided with a pair of axially aligned support shafts which in turn are supported by said casing.
6. The valve of claim 1 wherein said housing carries stops for limiting axial movement of said discs.
7. The valve of claim 1 wherein said gate assembly includes guide means for promoting straight-line axial movement of said discs.
8. A gate valve comprising:
    a casing enclosing annular seating surfaces defining opposed valve ports having a common centerline;
    a gate assembly pivotally mounted in said casing for movement toward and away from said centerline, said assembly including:
        a. a pair of valve discs having frontal sealing surfaces for respectively engaging said seating surfaces to close said ports;
        b. at least two generally L-shaped levers coupled at an intermediate point for pivotal movement about a common axis, the shorter legs of said levers being pivotally connected to different valve discs;
        c. drive means for effecting relative movement of said levers about said axis to move said discs along said centerline to close and open said ports;
        d. a housing encompassing said levers and drive means for isolating said levers and drive means from said casing, said housing including bellows respectively connected to said discs for accommodating movement of said discs along said centerline; and
        e. a rotatable shaft in said casing affixed to said housing for pivoting said gate assembly.
9. The valve of claim 8 wherein said shaft is hollow.
10. A gate valve comprising:
    a casing enclosing annular seating surfaces defining first and second ports having a common axis;
    a gate assembly in said casing including:
        a. a pair of valve discs having frontal sealing surfaces for respectively engaging said seating surfaces to close said ports;
        b. levers respectively connected to said discs;
        c. means for operating said levers to move said discs along said axis to open and close said ports; and
        d. a housing isolating said levers and said means from said casing, said housing including flexible sealing means respectively connected to said discs for accommodating movement of said discs along said axis, said housing being provided with a pair of axially aligned support shafts which in turn are supported by said casing, one of said shafts being hollow and being coupled to shaft-rotation means outside said casing.

* * * * *